United States Patent [19]
Cappels et al.

[11] Patent Number: 5,995,633
[45] Date of Patent: Nov. 30, 1999

[54] SYSTEM AND METHOD FOR MULTIPLEXING CONTROL SIGNALS OVER DATA SIGNAL CONDUCTORS

[75] Inventors: Richard D. Cappels, Santa Clara; Douglas M. Farrar, Los Altos; Bobby T. Hsieh, Sunnyvale; Takashi Mori, Saratoga, all of Calif.

[73] Assignee: Apple Computer, Inc., Cupertino, Calif.

[21] Appl. No.: 08/773,917

[22] Filed: Dec. 27, 1996

[51] Int. Cl.[6] .................................................. H02B 1/00
[52] U.S. Cl. .............................................. 381/123; 381/74
[58] Field of Search ............................. 381/74, 123, 309, 381/300; 370/485

[56] References Cited

U.S. PATENT DOCUMENTS 4,868,815  9/1989  Iwamura .................................. 370/485

FOREIGN PATENT DOCUMENTS 0139507   10/1979  Japan ...................................... 381/123
0041092    3/1982  Japan ...................................... 381/123
406113390  4/1994  Japan ...................................... 381/123

*Primary Examiner*—Minsun Oh Harvey
*Attorney, Agent, or Firm*—Gregory J. Koerner; Carr & Ferrell LLP

[57] ABSTRACT

A system and method for multiplexing control signals over data signal conductors comprises an audio source for generating audio signals, a speaker device for monitoring the audio signals, a first high-pass filter for filtering the audio signals, a signal cable over which the audio signals are transmitted, a second high-pass filter for again filtering the audio signals, and headphones for monitoring the audio signals. The system and method further comprises a current source for generating a control signal whenever the headphones are connected and for transmitting the control signals over the signal cable, and a detector device for receiving the control signals and responsively using them to mute the speaker device.

14 Claims, 7 Drawing Sheets

SYSTEM AND METHOD FOR MULTIPLEXING CONTROL SIGNALS OVER DATA SIGNAL CONDUCTORS

BACKGROUND OF THE INVENTION

1. Field of the Invention

This invention relates generally to computer systems and more particularly to a system and method for multiplexing control signals over data signal conductors.

2. Description of the Background Art

The efficient and accurate transmission of electronically-encoded information is an important consideration of manufacturers, designers and users of electronic information systems. The goal of designing and building an effective and reliable electronic device can frequently result in improved performance and reduced manufacturing costs, and can thus provide significant economic benefits for both users and manufacturers.

Referring to FIG. 1, a block diagram of a prior art system 110 for transmitting control signals and data signals is shown. Conventionally, a data signal source 112 generates data signals and then transmits the generated data signals over line 114 to data destination 116. Data destination 116 may then process and utilize the generated data according to the general design and purpose of system 110. System 110 may also conventionally include a control signal source 118 which generates control signals and then transmits the generated control signals over line 120 to govern the operation of a particular controlled device 122. The prior art system 110 of FIG. 1 thus requires two separate and discrete signal paths (lines 114 and 120) to effectively transmit the data signals and the control signals to respective data destination 116 and controlled device 122.

Multiplexing is a special transmission method which allows simultaneous communications to occur between multiple source and destination devices. Multiplexing techniques typically utilize a single signal path over which the various communications simultaneously occur. The use of a single signal path to perform several different communication functions advantageously results in a simpler and less costly system design. The increased efficiency and reduced cost of such a design may thus allow system manufacturers to provide a more economic overall system for the benefit of system users. Therefore, an improved system and method is needed for multiplexing control signals over data signal conductors.

SUMMARY OF THE INVENTION

In accordance with the present invention, a system and method are disclosed for multiplexing control signals over data signal conductors. In the preferred embodiment of the present invention, an audio source generates an audio signal which a first power amplifier amplifies and provides to drive an audio speaker.

The generated audio signal is also provided to an audio driver which transmits the audio signal to an input high-pass filter that passes only those audio signal frequencies which are greater than a selected system cutoff frequency. The high-pass filter then provides the audio signal to a signal cable. The audio signal is thus transmitted from the input high-pass filter to an output high-pass filter which also typically passes only those audio signal frequencies which are greater than the system cutoff frequency. The output high-pass filter then provides the audio signal to a second power amplifier which amplifies the audio signal and then provides the amplified audio signal to a headphone jack. Headphones may then receive the amplified audio signal by inserting a headphone plug into the headphone jack. A computer system user wearing the headphones may thus advantageously receive and hear the amplified audio signal.

In the preferred embodiment, when the headphones are connected to the headphone jack, a switch is closed to activate a current source which is a switched, rate-limited current source that generates a low-passed control signal. The generated control signal is then provided to a level detector via the aforementioned signal cable. The level detector is a low-passed direct-current (DC) level detector which detects and low-passes the received control signal to produce a detected control signal which is then provided to the first power amplifier to mute the audio speaker. The audio speaker is thus muted whenever the headphones are connected.

The present invention thus efficiently multiplexes control signals and audio signals over a single signal cable. Furthermore, the control signals do not interfere with the audio signals provided to headphones and, similarly, the audio signals do not interfere with the control signals provided by the level detector to mute the audio speaker.

DETAILED DESCRIPTION OF THE PREFERRED EMBODIMENT

In accordance with the present invention, a system and method are disclosed for multiplexing control signals over data signal conductors. The preferred embodiment of the present invention comprises an audio source for generating audio signals, a speaker device for monitoring the audio signals, a first high-pass filter for filtering the audio signals, a signal cable over which the audio signals are transmitted, a second high-pass filter for again filtering the audio signals, and headphones for monitoring the audio signals. The system and method further comprises a rate-of-change limited current source for generating a control signal whenever the headphones are connected and for transmitting the control signals over the signal cable, and a detector device for receiving the control signals and responsively using them to mute the speaker device.

Figure 1:
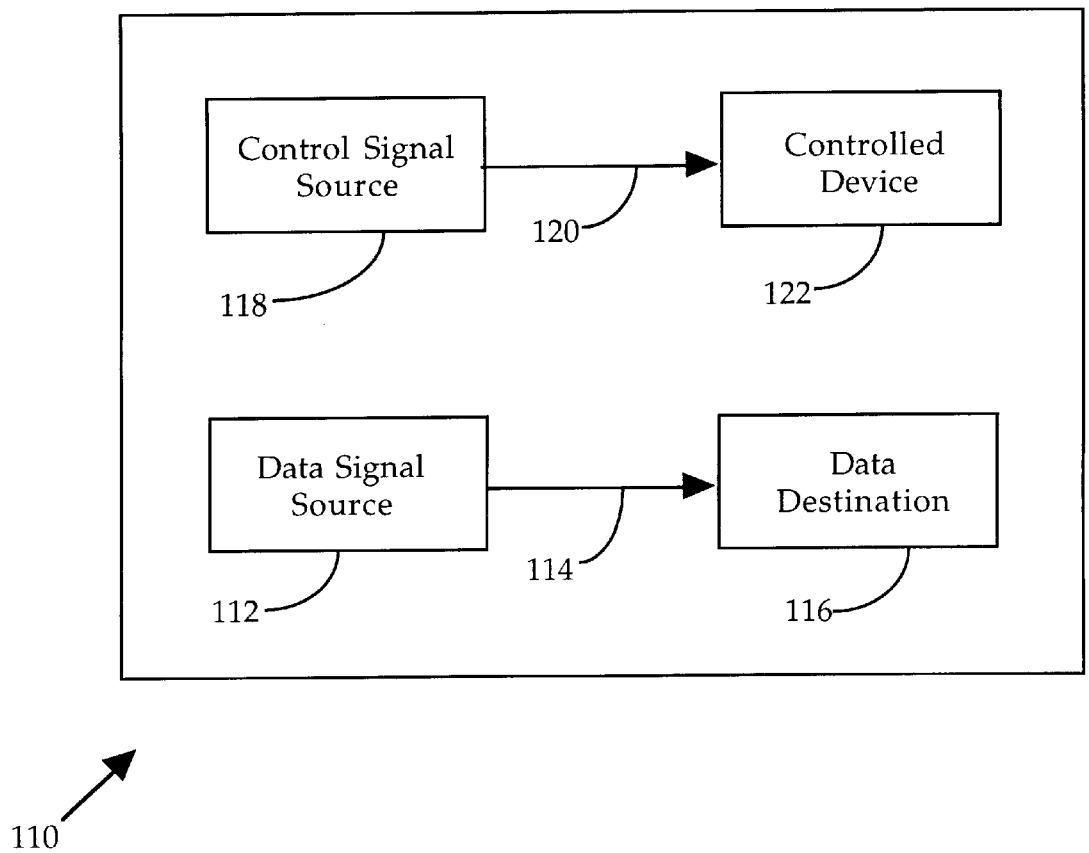
FIG. 1 is a block diagram showing a prior art system for transmitting control signals and data signals.
Figure 2:
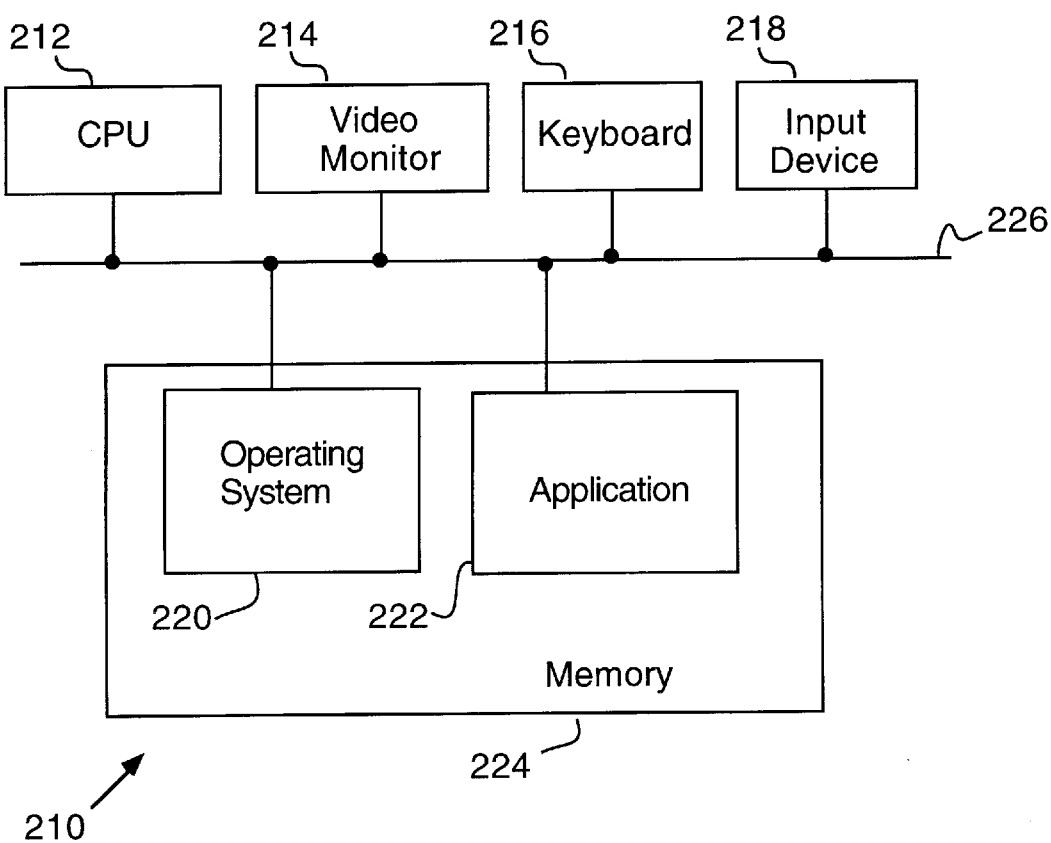
FIG. 2 is a block diagram of a computer system according to the present invention.

Referring now to FIG. 2, a computer system 210 is shown for multiplexing control signals over data signal conductors, according to the present invention. Computer system 210 preferably comprises a central processing unit (CPU) 212, a video monitor 214, a keyboard 216, an input device 218 and a memory 224. Memory 224 typically contains an operating system 220 and at least one application program 222. Each element of computer system 210 preferably has an input and an output coupled to a common system bus 226. Memory 224 may alternatively comprise various storage-device configurations, including Random-Access-Memory (RAM), Read-Only-Memory (ROM), and non-volatile storage devices such as floppy-disks and hard disk-drives. System bus 226 may alternatively be connected to a communications interface to permit computer system 210 to output information to a computer network.

Figure 3:
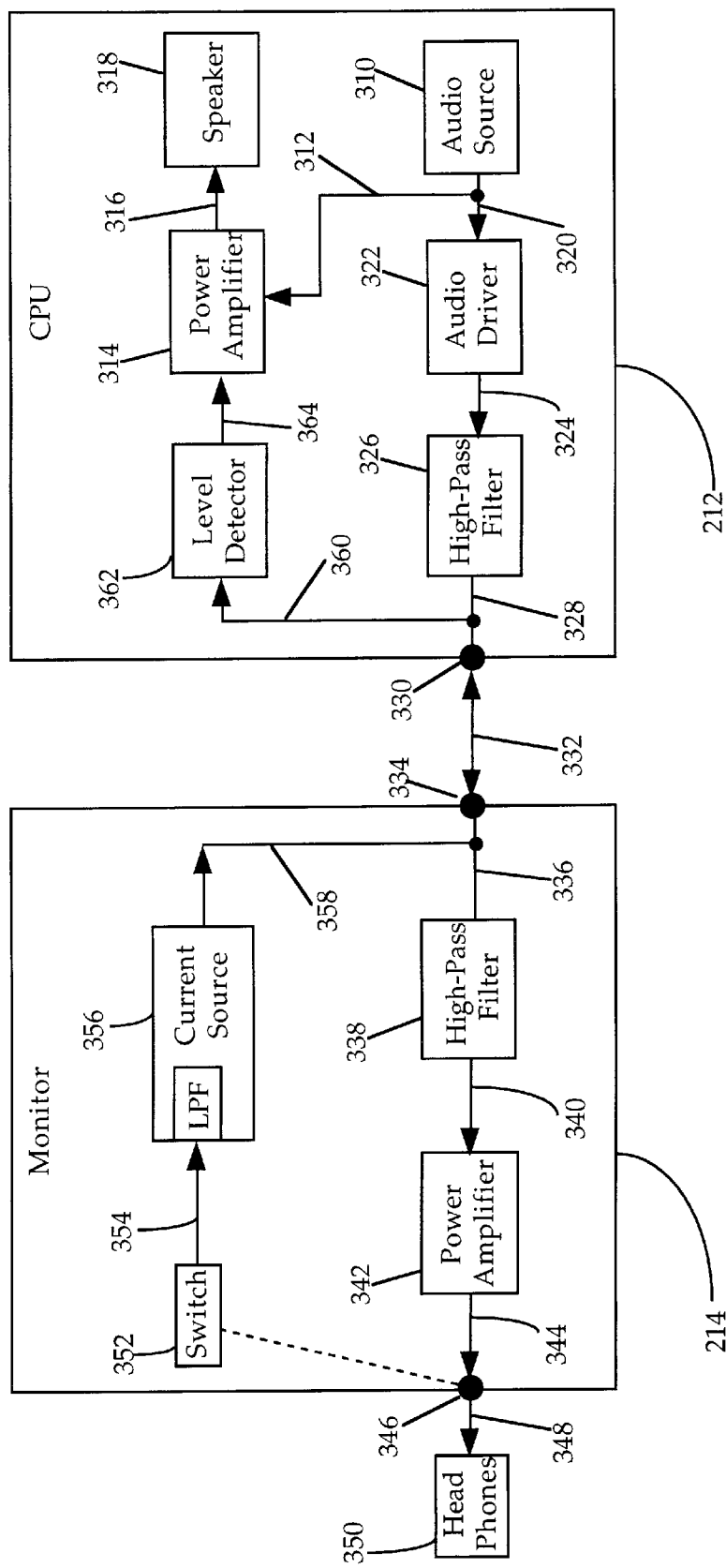
FIG. 3 is a block diagram of the monitor and CPU of the FIG. 2 computer system.

Referring now to FIG. 3, a block diagram for the preferred embodiment of monitor 214 and CPU 212 is shown, according to the present invention. In the preferred embodiment, an audio source 310 generates an audio signal which power amplifier 314 receives via line 312. Power amplifier 314 amplifies the generated audio signal and provides the amplified audio signal, via line 316, to drive speaker 318. The generated audio signal thus advantageously becomes audible to a user of computer system 210.

The generated audio signal is also provided, via line 320, to audio driver 322 which transmits the audio signal to a high-pass filter 326 via line 324. High-pass filter 326 passes only those audio signal frequencies which are greater than a selected system cutoff frequency (for example, 50 Hertz). High-pass filter 326 then provides the audio signal, via line 328, to a CPU connector 330.

A signal cable 332 is connected between CPU connector 330 and monitor connector 334. The audio signal is thus provided from high-pass filter 326 to a high-pass filter 338 via line 328, CPU connector 330, signal cable 332, monitor connector 334 and line 336. High-pass filter 338 typically passes only those audio signal frequencies which are greater than the system cutoff frequency selected above for high-pass filter 326. High-pass filter 338 then provides the audio signal, via line 340, to power amplifier 342 which amplifies the audio signal and then provides the amplified audio signal to headphone jack 346 via line 344.

In the preferred embodiment, headphones 350 may then receive the amplified audio signal, via line 348, by inserting a headphone plug, electrically connected to line 348, into headphone jack 346. A computer system 210 user wearing headphones 350 may thus advantageously receive and hear the amplified audio signal.

During periods of headphone 350 use, the audio provided by speaker 318 may no longer be required and further, may create an unwelcome distraction in the work environment. The present invention provides a methodology for controlling the operation of a device such as speaker 318, in response to a control state, such as headphones 350 use.

In the preferred embodiment, when headphones 350 are connected to headphone jack 346, a switch 352 is closed to activate current source 356 via line 354. Current source 356 includes a low-pass filter (LPF) as described below in conjunction with FIG. 4. Switch 352 may be conventionally operated by insertion of the headphone plug into headphone jack 346. In alternate embodiments, current source 356 may also be activated by a variety of other devices which sense the connection of headphones 350 to headphone jack 346, including microprocessors and other logic devices. Further, in alternate embodiments, current source 356 may be activated in response to various control states other than the connection of headphones 350 to headphone jack 346.

Current source 356 is a switched, rate-limited current source which generates a low-passed control signal onto line 358. In the preferred embodiment, current source 356 only generates control signals having frequencies which are lower than the system cutoff frequency discussed above in connection with high-pass filters 326 and 338. The operation of current source 356 is further discussed below in conjunction with FIG. 4. The generated control signal is then provided to level detector 362 via line 358, line 336, monitor connector 334, signal cable 332, CPU connector 330, line 328 and line 360.

Level detector 362 is a low-passed direct-current (DC) level detector which detects and low-passes the received control signal to produce a detected control signal which is then provided to power amplifier 314, via line 364, to mute speaker 318. Speaker 318 is thus muted whenever headphones 350 are connected to headphone jack 346. Level detector 362 is further discussed below in conjunction with FIG. 4. In alternate embodiments, the detected control signal may control devices other than speaker 318, and may also alternately control a device directly or can be sensed by a logic device such as a microprocessor.

The present invention thus efficiently multiplexes control signals and audio signals over signal cable 332. Furthermore, the control signals do not interfere with the audio signals provided to headphones 350 and, similarly, the audio signals do not interfere with the control signals provided by level detector 362.

Figure 4:
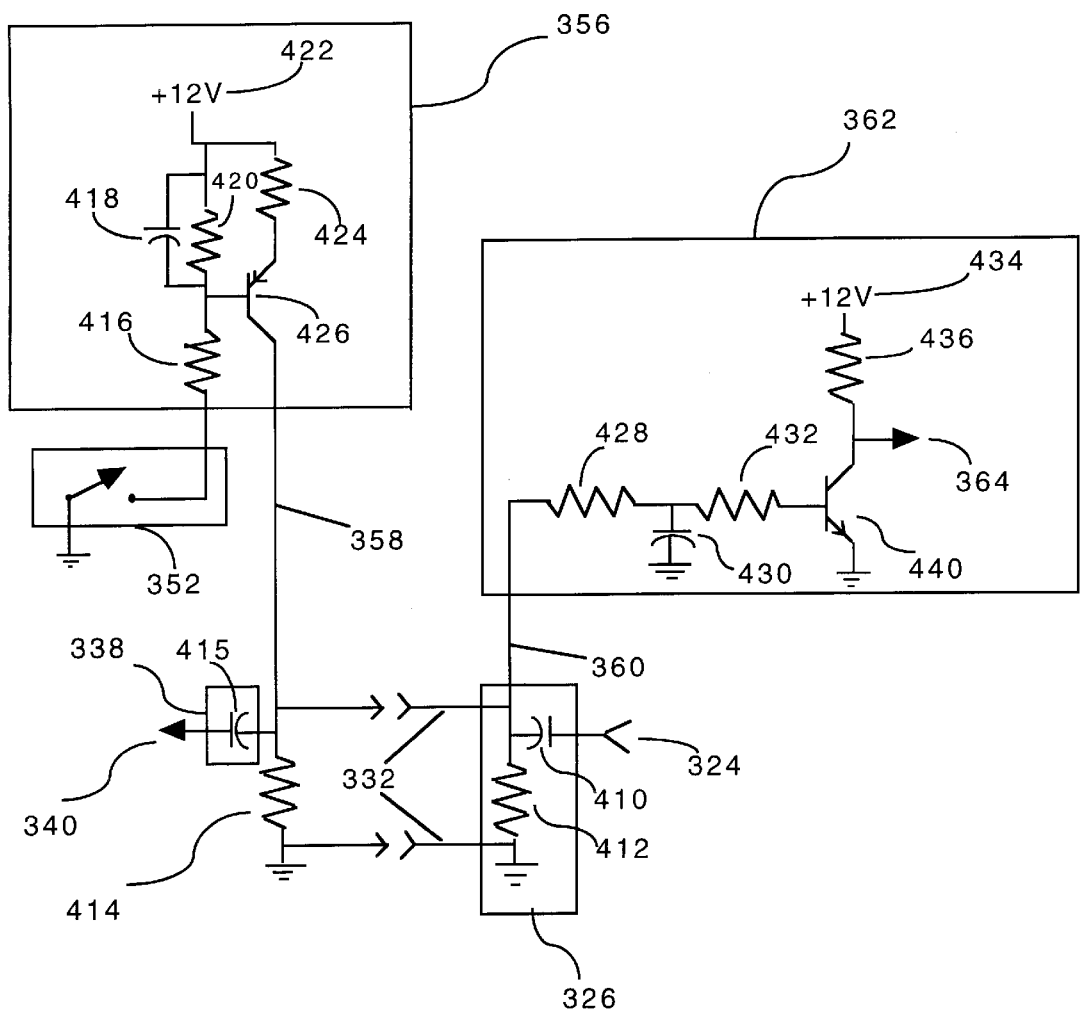
FIG. 4 is a schematic diagram of the preferred embodiment of the present invention.

Referring now to FIG. 4, a schematic diagram of the preferred embodiment of the present invention is shown. As discussed above in conjunction with FIG. 3, an audio signal is provided to an input high-pass filter 326 via line 324. High-pass filter 326 is formed of capacitor 410 and resistor 412. The high-pass filtering process is performed by capacitor 410 and resistor 412, in parallel with termination resistor 414, which are collectively selected to pass only those audio signal frequencies which are greater than the selected system cutoff frequency.

High-pass filter 326 then provides the audio signal, via signal cable 332, to high-pass filter 338, which is comprised of capacitor 415 and the load characteristic of the input of power amplifier 342 on line 340. High-pass filter 338 preferably passes only those audio signal frequencies which are greater than the system cutoff frequency selected for high-pass filter 326, as discussed above. High-pass filter 338 then provides the audio signal, via line 340, to power amplifier 342 which is connected to headphone jack 346.

As discussed above in conjunction with FIG. 4, switch 352 is closed when headphones 350 are connected to headphone jack 346. The closure of switch 352 causes current to flow through current source 356 to thereby responsively generate a control signal onto line 358. In the preferred embodiment, current source 356 is implemented to generate only control signals having frequencies which are lower than the system cutoff frequency discussed above in connection with high-pass filters 326 and 338.

Current source 356 is a switched, rate-limited current source which generates a low-passed control signal onto line 358. In the preferred embodiment, the control signal on line 358 has a rise time greater than thirty milliseconds. The generated control signal is triggered by switch 352 and is injected onto line 358 after passing through a low-pass filter having a cutoff frequency set by capacitor 418 and the parallel combination of resistors 416 and 420. This low-pass filter in current source 356 thus sets the slew rate (amps/second) for the current flowing from the collector of transistor 426. The slew rate of current source 356 determines the spectral content of the control signal and therefore the slew rate is selected to minimize the high-frequencies which may cause an audible artifact to be introduced into the audio signal. This high-frequency audible artifact is further prevented by passing the audio signal through high-pass filter 338, as discussed above.

The generated control signal is further low-passed by the combined effects of capacitors 415 and 410, resistors 414 and 412, the input characteristics of power amplifier 342 on line 340 and the output characteristics of audio driver 322 on line 324. This low-passing of the control signal combines with high-passing of the audio signals to effectively prevent the control signals from being heard on speaker 318. The generated control signal is then provided to level detector 362 via line 358, signal cable 332 and line 360.

Current source 356 operates to supply control signal current, however, introduction of the control signal by current source 356 does not affect the impedance of the audio path along signal cable 332. The output impedance of transistor 426 is substantially larger than the value of resistor 414. Regardless of the voltage on the collector of transistor 426, approximately the same amount of current flows on line 358. Current source 356 thus generates the control signal through signal cable 332 to level detector 362 without affecting the impedance of the audio signal path along signal cable 332. Current source 356 therefore advantageously transmits the control signal through signal cable 332 without affecting the level of the audio signal which is simultaneously present on signal cable 332.

Level detector 362 is a low-passed direct-current (DC) level detector which detects and low-passes the control signals received on line 360. Level detector 362 then responsively generates a detected control signal which is provided to power amplifier on line 364 to mute speaker 318. Level detector 362 includes a low-pass filter, comprised of resistor 428 and capacitor 430, which preferably passes only control signals having frequencies which are lower than the system cutoff frequency discussed above in connection with high-pass filters 326 and 338. This low-pass filter in level detector 362 effectively prevents audio signals from activating the control circuitry in CPU 212.

The present invention thus utilizes different segments of the frequency spectrum to separate the audio signals from the control signals. In operation, when switch 352 is closed, the low-frequency control signal voltage present on signal cable 332 changes to a logical high. Transistor 440 is then turned on by the received control signal voltage and responsively generates a logical low on line 364 to signal that switch 352 is closed.

In the preferred embodiment, termination resistor 414 and the current level from current source 356 are selected so that when signal cable 332 is not connected between monitor 214 and CPU 212, the open-circuit voltage across current source 356 and termination resistor 414 is low enough to prevent damage to electronic circuitry which is not designed to be compatible with computer system 210. Furthermore, termination resistor 414 and the current level from current source 356 are also preferably selected to prevent potential circuit damage caused by the short-circuit current output of the present invention's audio circuitry.

The present invention may be effectively implemented using a number of alternate embodiments. Using slow, time-dependent signaling protocols, slow transmission of more complex data may be performed over a single channel (for example, 0.2 Baud serial data using MFM or NRZ encoding, or a slow version of Apple Desktop Bus by Apple Computer, Inc. could be used for slow asynchronous bi-directional signaling).

Further, in stereo audio systems, use of separate signals on the left and right channels allows four different states to be signaled. Using two channels, slow synchronous communications may also be accomplished by using one line for the clock signal and the other line for data. A protocol such as I²C by Philips, Inc. could be accommodated at slow rates, thereby allowing bi-directional communications.

Multi-level signaling may also be accomplished on each line by sourcing or sinking current. A third state is the absence of a DC bias. Additional levels may be obtained by setting differing amounts of current. In some cases, it may be desirable for the current source and signaling circuitry to be powered by CPU 212 rather than by monitor 214, thereby allowing detection of headphones 350 when power to monitor 214 is turned off. In such a case, power may be provided on one of the audio lines, and the second audio line may be used to transmit the control signal.

Figure 5:
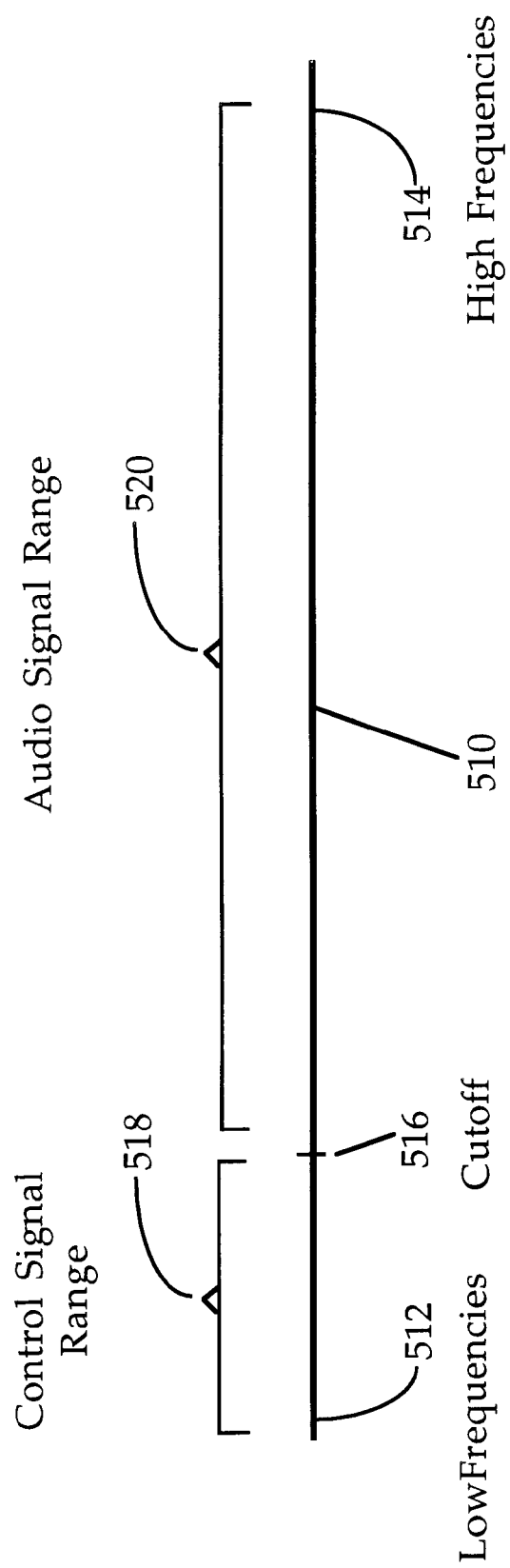
FIG. 5 is a graph of signal frequency ranges affected according to the present invention.

Referring now to FIG. 5, a graph of signal frequency ranges affected by the present invention is shown. A frequency spectrum 510 is depicted which includes low frequencies 512 located on the extreme left of spectrum 510. In the preferred embodiment, low frequencies 512 may approach a DC level at their lower limits.

The low frequencies 512 increase linearly, moving from left to right, until relatively high frequencies 514, located on the extreme right of spectrum 510, are depicted. A cutoff frequency 516 is also depicted on spectrum 510. Cutoff frequency 510 is further discussed above in conjunction with FIGS. 3 and 4 and current source 356, high-pass filters 338 and 326 and level detector 362.

The present invention utilizes different segments of frequency spectrum 510 to effectively separate the audio signals from the control signals. FIG. 5 illustrates this aspect of the present invention by depicting a control signal range 518 which is located below cutoff frequency 516 and an audio signal range 520 which is located above cutoff frequency 516. As FIG. 5 illustrates, control signal range 518 and audio signal range 520 do not overlap and thus do not share any frequencies on spectrum 510.

Figure 6A:
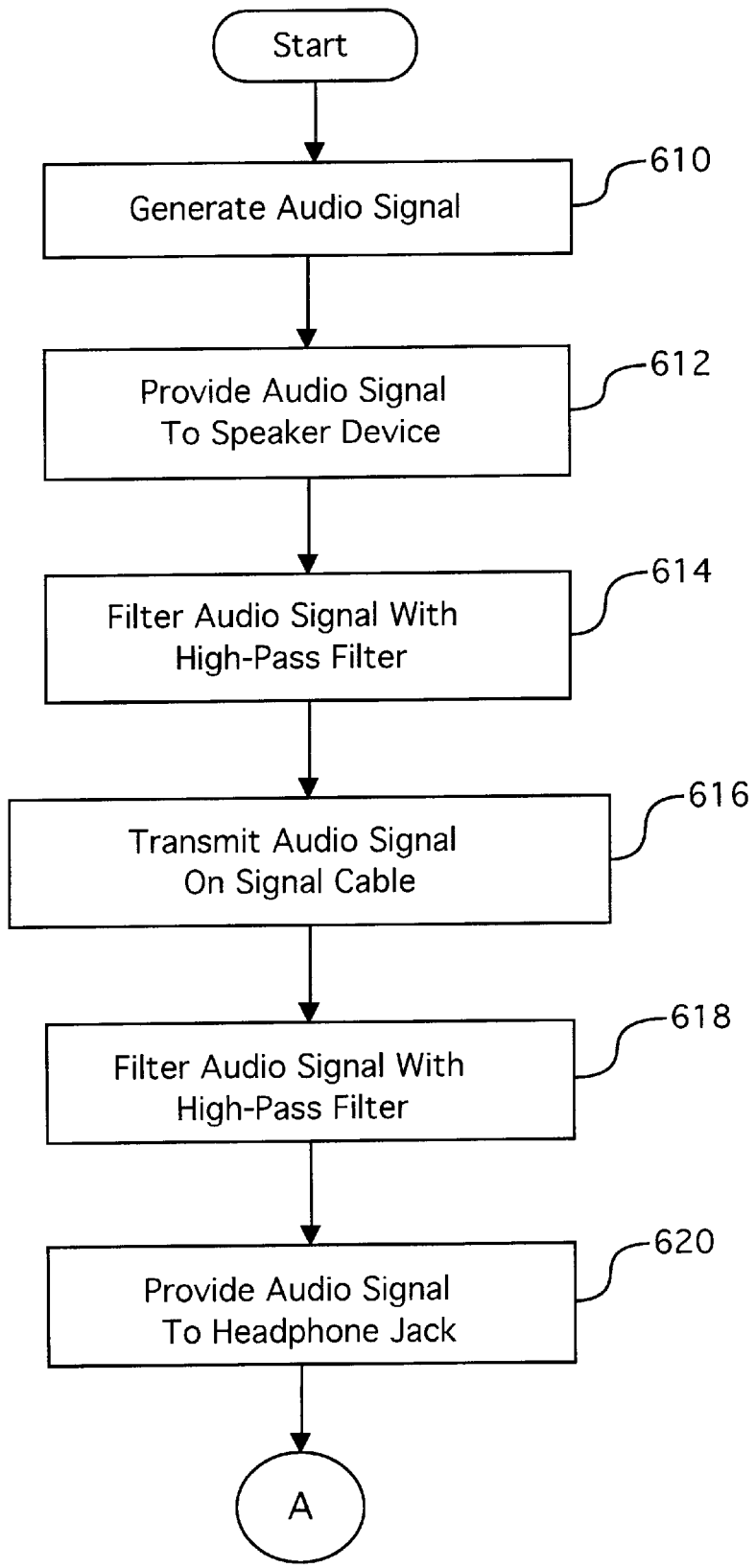
FIG. 6A is an initial portion of a flowchart of preferred method steps for multiplexing control signals over data signal conductors.

Referring now to FIG. 6A, an initial portion of a flowchart of preferred method steps for multiplexing control signals over data signal conductors is shown. Initially, audio source 310 generates 610 an audio signal and then provides 612 the audio signal to speaker 318 after amplifying the audio signal by using power amplifier 314. Next, audio source 310 transmits the unamplified audio signal through audio driver 322 to high-pass filter 326 which filters 614 the audio signal and transmits 616 the audio signal over signal cable 332. High-pass filter 338 then receives and responsively filters 618 the audio signal before providing 620 the audio signal, through power amplifier 342, to headphone jack 346.

Figure 6B:
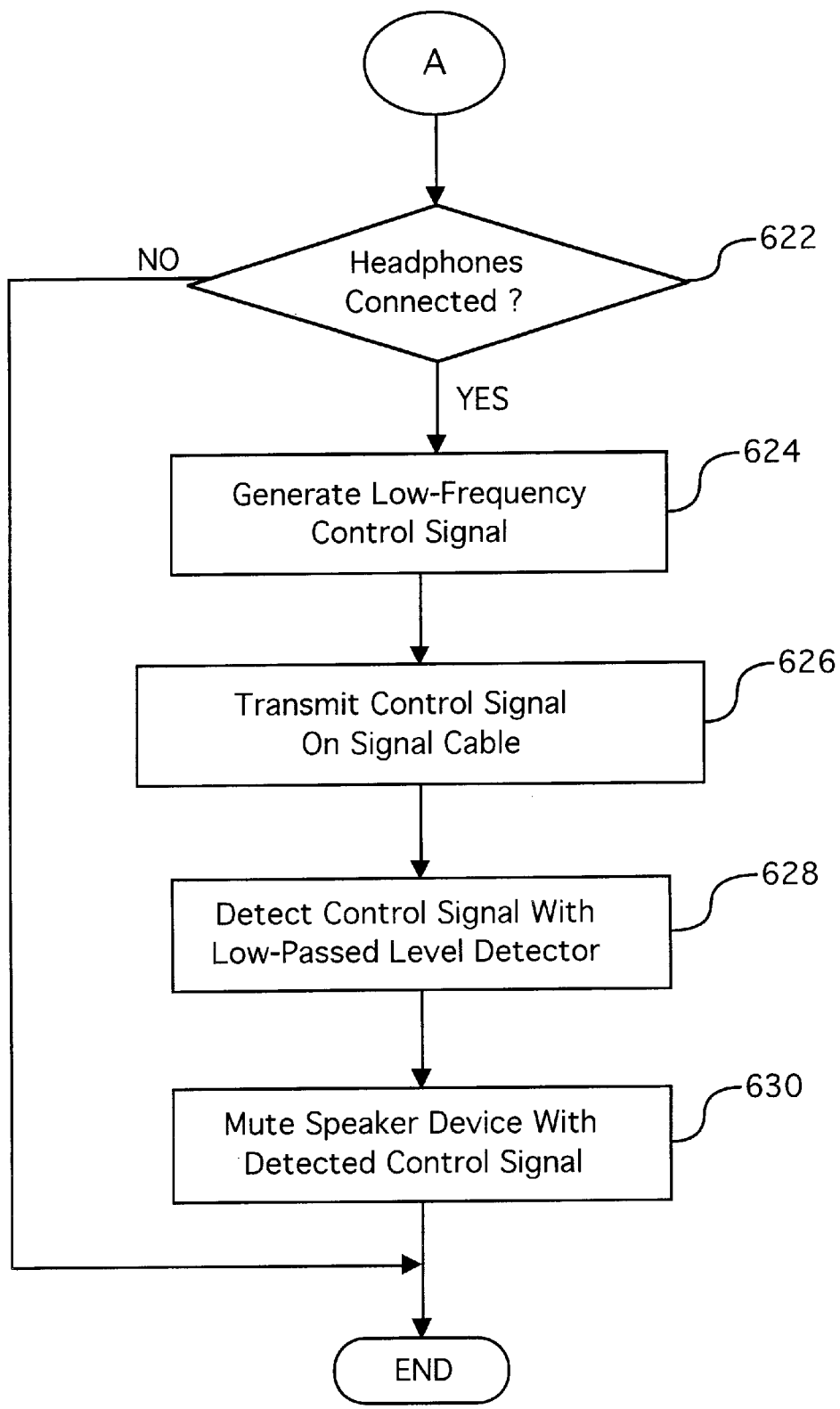
FIG. 6B is a final portion of a flowchart of preferred method steps for multiplexing control signals over data signal conductors.

Referring now to FIG. 6B, a final portion of a flowchart of preferred method steps for multiplexing control signals over data signal conductors is shown. In the preferred embodiment, switch 352 indicates whether headphones 350 are connected 622 to headphone jack 346. If headphones 350 are not connected, then the FIG. 6B process ends.

If, however, headphones 350 are connected, then current source 356 responsively generates 624 a low-frequency control signal and transmits 626 the generated control signal over signal cable 332. Next, level detector 362 detects 628 and low-passes the transmitted control signal and then provides the detected control signal to power amplifier 314 to mute 630 speaker 318.

The invention has been explained above with reference to a preferred embodiment. Other embodiments will be apparent to those skilled in the art in light of this disclosure. For example, the present invention may readily be implemented to control devices other than the speaker 318 described above in conjunction with the preferred embodiment. Furthermore, the control signal may multiplexed in combination with signals other than the audio signal described in the foregoing discussion of the preferred embodiment. Therefore, these and other variations upon the preferred embodiments are intended to be covered by the present invention, which is limited only by the appended claims.

What is claimed is:

1. A system for providing control signals and data signals, said system comprising:

a data source for generating said data signals;

a first filter device coupled to said data source for filtering said data signals;

a signal cable coupled to said first filter device for transmitting said data signals;

a second filter device coupled to said signal cable for filtering said data signals;

a current source for generating said control signals onto said signal cable in response to a control state; and a detector for detecting said control signals and responsively providing said control signals to a controlled device, said data signals including audio signals, said control state comprising connecting headphones to said second filter device, and said controlled device being a speaker which is muted by said control signals.

2. The system of claim 1 wherein said control signals are low-frequency signals generated by limiting the rate of current change in said current source.

3. The system of claim 1 wherein said first and second filter devices are high-pass filters.

4. The system of claim 1 wherein said detector includes a low-pass filter device.

5. The system of claim 1 further comprising a switch device which triggers said current source to generate said control signals in response to said control state.

6. The system of claim 1 wherein generating said control signals does not change an impedance value of said signal cable.

7. The system of claim 1 further comprising a termination resistor coupled to said second filter device for limiting any open-circuit voltages.

8. A method for providing control signals and data signals, said method comprising the steps of:

generating said data signals from a data source;

filtering said data signals using a first filter device coupled to said data source;

transmitting said data signals over a signal cable coupled to said first filter device;

filtering said data signals using a second filter device coupled to said signal cable;

generating said control signals onto said signal cable using a current source in response to a control state; and detecting said control signals with a detector and responsively providing said control signals to a controlled device, said data signals including audio signals, said control state comprising connecting headphones to said second filter device, and said controlled device being a speaker which is muted by said control signals.

9. The method of claim 8 wherein said control signals are low-frequency signals generated by limiting the rate of current change in said current source.

10. The method of claim 8 wherein said first and second filter devices are high-pass filters.

11. The method of claim 8 wherein said detector includes a low-pass filter device.

12. The method of claim 8 further comprising a switch device which triggers said current source to generate said control signals in response to said control state.

13. The method of claim 8 wherein generating said control signals does not change an impedance value of said signal cable.

14. The method of claim 8 further comprising a termination resistor coupled to said second filter device for limiting any open-circuit voltages.

* * * * *